(No Model.)
C. WELSH.
CAR FENDER.
No. 554,158.
Patented Feb. 4, 1896.
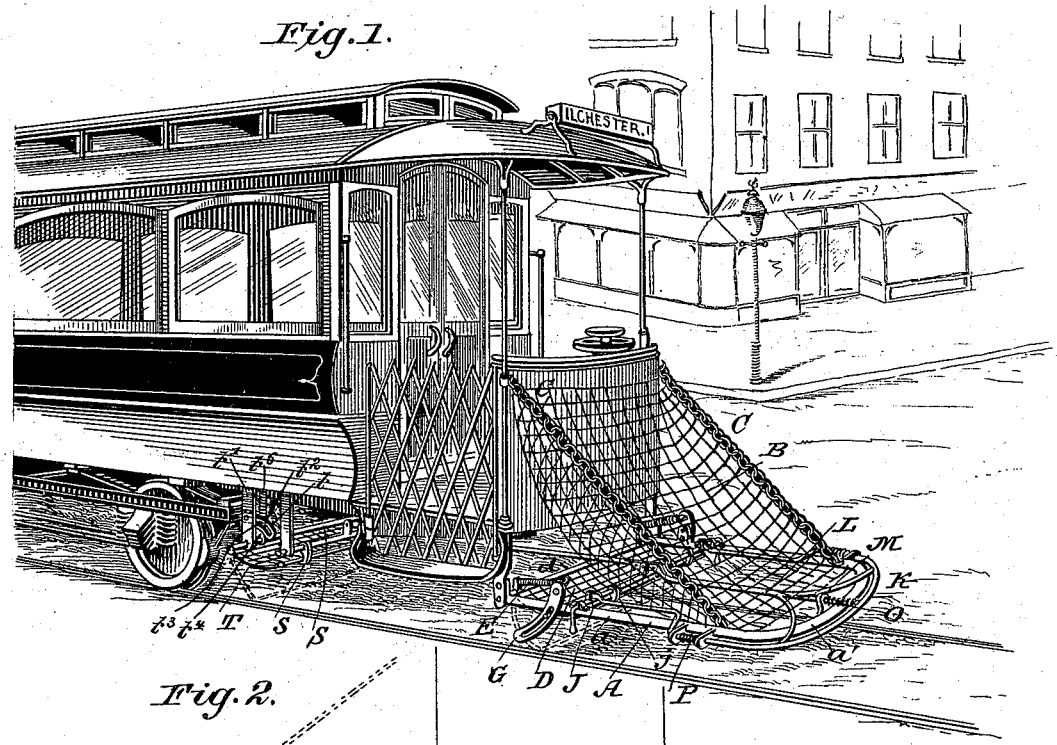
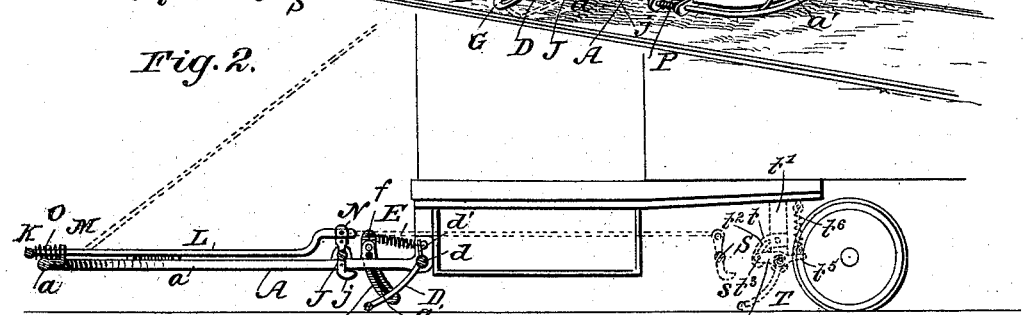
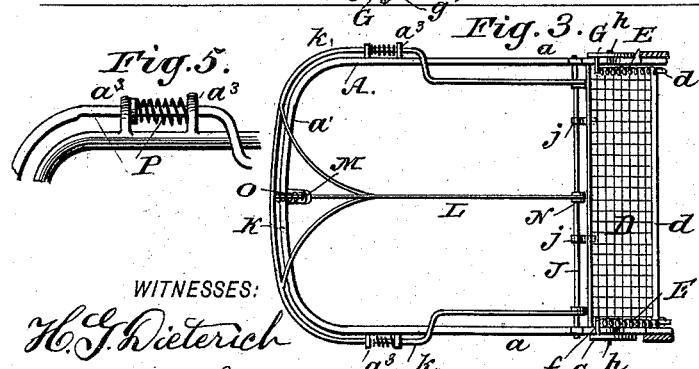
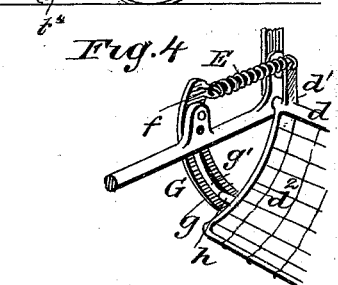
WITNESSES:
H. J. Dieterich
J. Edw. Luckett
INVENTOR
Charles Welsh
BY
O'Meara & Co.
ATTORNEYS

UNITED STATES PATENT OFFICE.

CHARLES WELSH, OF ILCHESTER, MARYLAND, ASSIGNOR OF ONE-HALF TO MILTON W. WELSH, OF SAME PLACE.

CAR-FENDER.

SPECIFICATION forming part of Letters Patent No. 554,158, dated February 4, 1896.

Application filed August 29, 1895. Serial No. 560,868. (No model.)

*To all whom it may concern:*

Be it known that I, CHARLES WELSH, residing at Ilchester, in the county of Howard and State of Maryland, have invented a new and Improved Car-Fender, of which the following is a specification.

My invention relates to improvements in car-fenders for electric and cable cars, and it primarily has for its object to provide a fender of a simple and inexpensive construction, which can be easily fitted to any of the car-bodies now in general use, and which will effectively serve for its intended purposes.

My invention also has for its object to provide a car-fender mechanism having a yielding impact member and a supplemental drop or trap guard connected with and adapted to be automatically released by back-pressure on the front or impact member, whereby a wheel-guard is provided which will positively prevent the smallest child or even a small animal from getting under the wheels.

With other minor objects in view, which hereinafter will be referred to, my invention consists in a car-fender comprising the peculiar combination and novel arrangement of parts, such as will be first described in detail, and then be specifically pointed out in the appended claims, reference being had to the accompanying drawings, in which—

Figure 1 is a perspective view of a portion of a car-fender with my improvements applied. Fig. 2 is a longitudinal section of a portion of a car with my fender applied, the trap-guard being shown tripped and down close over the track. Fig. 3 is a plan view of my improved fender devices, and Figs. 4 and 5 are detail views of parts hereinafter specifically referred to.

In its practical construction my improved fender comprises a main frame A, which is connected with the car-body and consists of the side bars $a$ $a$ and the front or trip bar $a'$. This frame A extends outward from the car-body in a horizontal plane a suitable distance above the track, so as to trip a body or cause it to fall back into the netting B, which is secured to the frame A and to the stay chains or ropes C C, which are secured to the upper end of the car-dash and to the forward portion of the side bars $a$, as shown.

It should be stated that the inner ends of the side bars $a$ may be securely fastened to the car-body or detachably connected therewith, so that the entire fender, if desired, may be moved and connected with either end of the car and dash.

At a point preferably under the front end of the car-platform is journaled a supplemental or trap guard D, which, when in its lowered position, is adapted to come down close to the rails.

The hinge or journal rod $d$ of such trap D has crank projections $d'$, to which are connected the inner ends of springs E, the outer ends of which are connected to studs $f$ on the upper ends of guides G, secured to the side arms $a$, as clearly shown in Figs. 1 and 4, their lower ends, $g$, being curved rearward and provided with slots $g'$, into which project studs $h$ on the side bar $d^2$ of the guard D, which bars it will be noticed curve forward in a direction opposite to the curvature of the ends $g$ of the said guard. By this arrangement of parts it is clear that by swinging the guard D up an increased tensile strain will be stored up on the springs E, which will serve when the guard is released in the manner presently described to quickly swing the said guard down over the track. It will be also manifest that the extent of the drop of such guard can be governed by the guides G, which are adjustably connected to the side bars, as most clearly shown.

J indicates a transverse rock-shaft journaled on the side arms $a$ $a$, which has finger or pawl members $j$ $j$, which are adapted to engage the front end of the guard D and hold it to an elevated position.

K indicates a yielding impact member which passes around the front of the main frame and normally rests about two inches in front of the same. This member K is normally held to its outward position by spring-pressure, it having a central rearwardly-extending arm L, which passes through a guide M on the front bar of frame A and has its rear end adjustably connected to a crank member N on the rock-shaft J, the side arms $k$ of such frame being also extended rearward and connected to the said shaft J in a similar manner, as shown, such side arms $k$ being guided in apertured ears $a^3$ on the side arms $a$, as shown.

O and P indicate coil-springs fitted about the front end of the central arm and around the side arms, respectively, (see Fig. 5,) and are so arranged as to normally move the said frame K to its outer or normal position.

If desired, one of the plunger members of the frame K can extend back and engage with a second rock-shaft, S, transversely held in front of the forward wheels, which shaft S has pawls or holding-fingers $s\ s$, which are adapted to hold a second wheel-guard, T, normally to its elevated position, and in order to prevent said second guard, T, falling too low I employ the forwardly-curved and depending guide-arms $t$, attached to the pendent standards $t'$, to which the guard T is pivoted, said arms $t$ being slotted, as shown at $t^2$, in which slide the pins $t^3$, carried upon the ends of the fingers $t^4$, formed upon the guard T, said slot limiting the downward movement of the pin and guard.

A rearwardly-extending finger $t^5$ is formed upon the rear side of the guard, and between the said finger and the bottom timber is interposed a coil-spring or other yielding connection $t^6$, the purpose of which is to aid in throwing the guard T down, and it also acts as a cushion to prevent said guard falling too hard, because after said spring acts to assist in throwing the guard it then becomes compressed, and in so doing acts as a cushion. It is manifest that this second wheel-guard may be omitted without departing from my invention, it being also understood that the details of mechanism may be varied.

From the foregoing description, taken in connection with the accompanying drawings, it will be readily seen that when the parts are in their normal position, the guard D being elevated that so soon as the yielding member strikes a body the shaft J will be rocked and release the guard, which, through the medium of the springs E E, will be swung down close to the track and make it impossible for a body, should it get under the frame A, from engaging the wheels.

The guard D can be set to its elevated position by hand.

Having thus described my invention, what I claim, and desire to secure by Letters Patent, is—

1. In a car-fender the combination with a stationary front frame, of the main and supplemental wheel-guards, and a spring impact member adapted to drop the wheel-guards at one time, substantially as shown and described.

2. An improved car-fender comprising a main or trip frame, a wheel-guard arranged at the front end of the car, a second wheel-guard arranged in front of the wheels, said guards adapted when released to drop into an operative position, detent devices for holding the said guards elevated, and a yielding impact member connected with such detent devices, adapted when it engages a body and is pressed back to release the wheel-guards substantially as and in the manner shown and described.

3. The combination with the frame A, having a rock-shaft J, having detent pawl members pivoted to the rear end of the swinging guard D, the adjustable slotted guides G, secured to the frame A, springs E, connected to the guides G, and the guard D, and means for rocking the shaft J, as and for the purposes described.

4. The combination with the main and supplemental guard and means for dropping the latter, of the slotted guide-arms arranged adjacent to the supplemental guard, the fingers upon said guard and pins working in said slotted arms, and the spring connection between said supplemental guard and the car-frame substantially as shown and for the purposes described.

CHARLES WELSH.

Witnesses:
H. G. DIETERICH,
J. EDW. LUCKETT.